US010756602B2

(12) United States Patent
Watrin et al.

(10) Patent No.: US 10,756,602 B2
(45) Date of Patent: Aug. 25, 2020

(54) GEARED MOTOR UNIT HAVING A POSITION SENSOR SURROUNDING THE OUTPUT GEAR

(71) Applicant: MOVING MAGNET TECHNOLOGIES, Besançon (FR)

(72) Inventors: Mathieu Watrin, La Chaux-de-Fonds (CH); Christophe Adler, Malleray (CH); Damien Laforge, Dannemarie-sur-Crete (FR); Gaël Andrieux, Evilard (CH)

(73) Assignee: Moving Magnet Technologies, Besancon (FR)

( * ) Notice: Subject to any disclaimer, the term of this patent is extended or adjusted under 35 U.S.C. 154(b) by 0 days.

(21) Appl. No.: 16/337,192

(22) PCT Filed: Sep. 28, 2017

(86) PCT No.: PCT/FR2017/052639
§ 371 (c)(1),
(2) Date: Mar. 27, 2019

(87) PCT Pub. No.: WO2018/060630
PCT Pub. Date: Apr. 5, 2018

(65) Prior Publication Data
US 2019/0229587 A1 Jul. 25, 2019

(30) Foreign Application Priority Data
Sep. 28, 2016 (FR) ...................................... 16 59159

(51) Int. Cl.
*H02K 11/215* (2016.01)
*F02D 11/10* (2006.01)
(Continued)

(52) U.S. Cl.
CPC ......... *H02K 11/215* (2016.01); *F02D 9/1065* (2013.01); *F02D 11/10* (2013.01);
(Continued)

(58) Field of Classification Search
CPC .......... F02D 11/10; F02D 9/10; F02D 9/1065; F02D 2011/102; H02K 11/38; H02K 7/116; H02K 11/215; H02K 7/1166
(Continued)

(56) References Cited
U.S. PATENT DOCUMENTS 6,522,038 B2 * 2/2003 Byram ..................... F02D 11/10
251/129.11
7,784,365 B2 8/2010 Masson et al.
(Continued)

FOREIGN PATENT DOCUMENTS
DE 10262404 B3 2/2016

*Primary Examiner* — Naishadh N Desai
(74) *Attorney, Agent, or Firm* — Harness, Dickey & Pierce, PLC

(57) ABSTRACT

The disclosure presents a geared motor unit including a housing having an electric motor formed of a coiled stator assembly and of a magnetized rotor, the housing further including a printed circuit board for connecting and controlling the motor, a movement-reducing gear train, a sensor magnet and a magnetosensitive probe. The gear train includes a toothed movement output gear, the sensor magnet being ring-shaped and being rigidly connected to the output gear. An output gear is extended on either side of the sensor magnet by two guides cooperating with the two opposite walls of the housing; a ring-shaped magnet surrounds the axis of rotation of the output gear; a printed circuit board includes a controller controlling the motor and extends up to the vicinity of the output gear. The printed circuit board includes, in the area located in the vicinity of the output gear, the magnetosensitive probe which is connected directly, (Continued)

electrically and mechanically, to the area and is located axially or radially facing a ring-shaped magnet.

16 Claims, 6 Drawing Sheets

(51) Int. Cl.
    *H02K 7/116*     (2006.01)
    *H02K 11/38*     (2016.01)
    *F02D 9/10*     (2006.01)

(52) U.S. Cl.
    CPC .......... *H02K 7/1166* (2013.01); *H02K 11/38* (2016.01); *F02D 2011/102* (2013.01)

(58) Field of Classification Search
    USPC ........................................ 310/83, 4–8, 49.47
    See application file for complete search history.

(56) References Cited

U.S. PATENT DOCUMENTS

| | | | |
|---|---|---|---|
| 9,316,482 | B2 | 4/2016 | Delbaere et al. |
| 9,714,849 | B2 | 7/2017 | Biwersi et al. |
| 10,122,311 | B2 | 11/2018 | Andrieux et al. |
| 2002/0074890 | A1 | 6/2002 | Byram |
| 2003/0184177 | A1* | 10/2003 | Enzinna ................. H02K 7/125 |
| | | | 310/93 |
| 2008/0314164 | A1 | 12/2008 | Masson et al. |
| 2011/0016960 | A1* | 1/2011 | Debrailly ............. H02K 11/215 |
| | | | 73/115.07 |
| 2013/0169270 | A1 | 7/2013 | Delbaere et al. |
| 2014/0298939 | A1* | 10/2014 | Kim ...................... H02K 7/116 |
| | | | 74/411.5 |
| 2017/0001304 | A1 | 1/2017 | Kato |
| 2017/0047817 | A1* | 2/2017 | Tanaka ................. H02K 11/215 |
| 2017/0085203 | A1 | 3/2017 | Andrieux et al. |
| 2018/0123423 | A1* | 5/2018 | Croce, Jr. ............. H02K 7/025 |

* cited by examiner

COUPE A-A

COUPE A-A

GEARED MOTOR UNIT HAVING A POSITION SENSOR SURROUNDING THE OUTPUT GEAR

CROSS REFERENCE TO RELATED APPLICATIONS

This application is a National Phase Entry of International Patent Application No. PCT/FR2017/052639, filed on Sep. 28, 2017, which claims priority to French Patent Application No. 16/59159, filed on Sep. 28, 2016, both of which are incorporated by reference herein.

TECHNICAL FIELD

The present invention relates to the field of geared motor units, and more particularly geared motor units intended for automotive applications, involving great robustness and a design that limits maintenance and space requirements. Such geared motor units usually include an electromagnetic part, with a permanent magnet rotor and a coiled stator, controlled by an electronic circuit. A magnetic sensor provides a signal used by the electronic circuit to servo-control the electromagnetic part. A gear train transmits the movement of the rotor to an output shaft.

BACKGROUND AND SUMMARY

A geared motor unit for valve control described in European patent application EP1217192 is particularly well known in the state of the art. This prior art document describes a motor controlling connection grids through a gear system. A magnetic sensor is provided opposite the end of the output shaft, which includes a magnet at the end of the shaft associated with flow concentrators.

This solution is not satisfactory for several reasons. First of all, the electromechanical architecture has a large footprint, which does not allow for a compact design. Secondly, the connection of the various electrical components requires the use of connection technology, which is a source of failure. Thirdly, this solution is incompatible with an application requiring a hollow shaft. Finally, this embodiment involves extending the output shaft to enable the magnet to be positioned after the shaft has been guided.

The invention aims to remedy these drawbacks by offering a very compact and robust solution that significantly reduces connectivity. One of the aims of the invention is to reduce to a minimum the problems of reliability resulting from the electrical connection of the various components of a geared motor unit, and in particular the connection of the coils with the control circuit, the connection of the position sensor with this control circuit and the connection with the connector of the geared motor unit. The aim is to reduce the risk of failures and also to simplify assembly, for industrial mass-production.

Another aim is to improve compactness, by optimizing the positioning of the main components of the geared motor unit, namely the electromagnetic actuator, the gear train and the electronic circuit and by minimizing unused spaces. Another aim is to ensure optimal mechanical strength and guidance of the gear train and especially of the output shaft, through perfect precision and mechanical robustness of the drive, even when the geared motor unit is subjected to high forces. An optional aim is to enable one embodiment with a through output shaft.

In order to be able to produce a compact and integrated assembly that can be used in an industrial context, another one of the objects of the invention is to be able to form an assembly integrating a function such as a valve body by forming an integral stem with the housing of the geared motor unit. For this purpose, the invention in its most general sense relates to a geared motor unit consisting of a housing comprising an electric motor formed of a coiled stator assembly and a magnetized rotor, said housing further comprising a printed circuit board for connecting and controlling the motor, a train of motion-reducing gears, a sensor magnet and a magneto-sensitive probe, the train of gears comprising a toothed movement output gear, the sensor magnet being ring-shaped and being rigidly connected with said output gear, characterized in that said output gear is extended on either side of the sensor magnet by two guides cooperating with the two opposite walls of the housing, said ring-shaped magnet surrounds the axis of rotation of the output gear, said printed circuit board includes the means for controlling said motor and extends to the vicinity of the output gear, said printed circuit board comprises, in the area located in the vicinity of the output gear, said magneto-sensitive probe connected directly electrically and mechanically to said area and located opposite, axially or radially, said ring-shaped magnet.

Preferably, the magnetization direction of said sensor magnet has at least one angularly variable component. Preferably also, the rotor is extended by a pinion and said pinion and the toothed output gear bearing said ring-shaped magnet are located on either side of said printed circuit board. In a particular embodiment, the magneto-sensitive probe is connected to the printed circuit board on the surface opposite the one bearing most of the other electronic components.

In an alternative embodiment, the gear train includes intermediate toothed gears located on one side of the printed circuit board and the toothed output gear is located on the opposite side of the printed circuit board. Alternatively, the rotor is extended by a pinion on one side of said printed circuit, said gear train having a series of intermediate toothed gears driving the toothed output gear located on the opposite side of said printed circuit board. The geared motor unit can have a common shaft with two intermediate toothed gears and said printed circuit board can be traversed by the shaft of the output toothed gear or by the shaft of the rotor of the actuator.

Advantageously, said permanent magnet has an angularly variable magnetization direction and a tubular shape, the magneto-sensitive probe being placed in a radial position with respect to said magnet. The invention makes it possible to produce a hollow toothed output gear shaft going through said housing. Advantageously, said housing includes means for guiding each of the ends of the shaft of the toothed output gear on either side of the printed circuit board. Preferably, the toothed output gear is coaxial with the rotor.

In order to form an integrated assembly, said housing can integrate a stem blocked by a movable flap rigidly connected to and controlled by the toothed output gear. The housing casings then directly integrate this stem (obtained by moulding a plastic or metal material for example). The invention can advantageously be applied to an air conditioning valve having a rotating flap activated by the shaft of the geared motor unit toothed output gear, or to an air shutter comprising at least one movable flap activated by the shaft of the geared motor unit toothed output gear, or to a throttle body for automotive air intake comprising at least one movable flap actuated by the shaft of the geared motor unit toothed output gear, or a turbocharger relief valve comprising at least one movable lever actuated by the shaft of the geared motor unit toothed output gear. The control of water valves, of the thermostat type, is particularly addressed by this invention.

BRIEF DESCRIPTION OF THE FIGURES

The present invention will be best understood upon reading the following detailed description of a non-restrictive exemplary embodiment, while referring to the appended drawings, wherein.

DETAILED DESCRIPTION OF A NON-LIMITING EXAMPLE

Figure 1A:
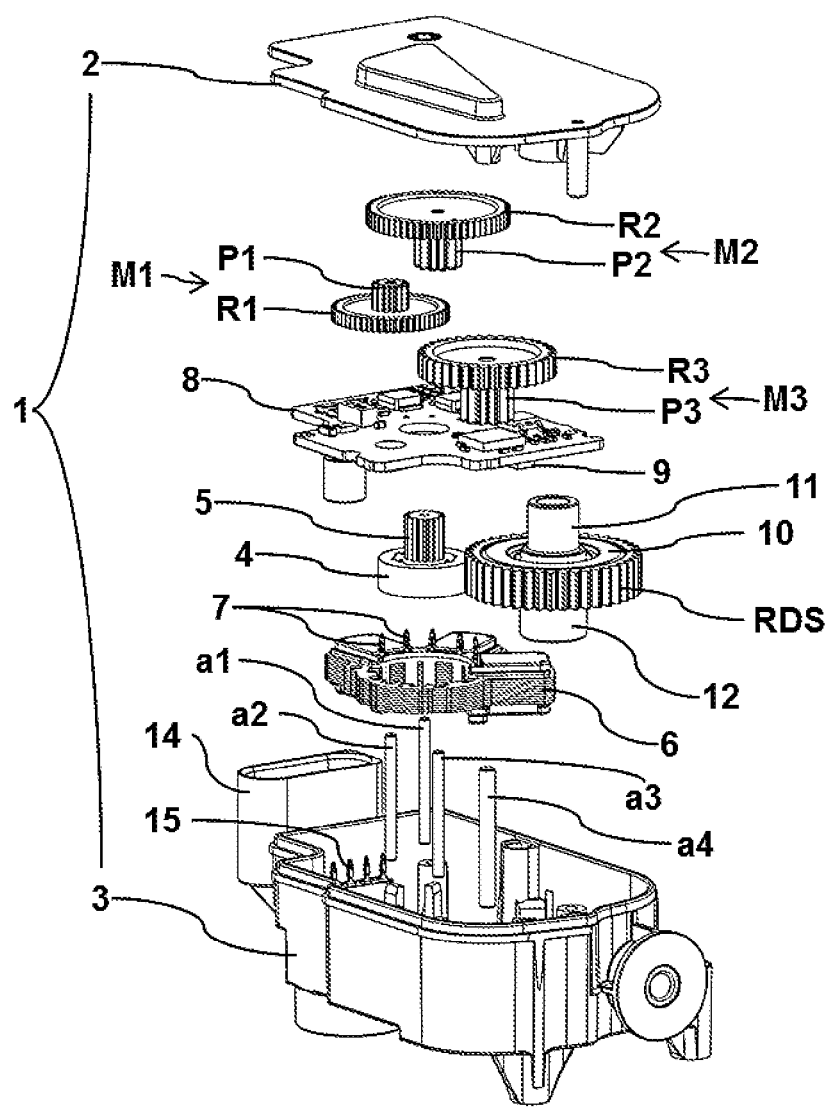
FIGS. 1a, 1b, 1c and 1d represent a first embodiment of a geared motor unit according to the invention according to views, respectively exploded in front perspective view, exploded in rear perspective view, from above, without upper housing, longitudinal sectional view.
Figure 1B:
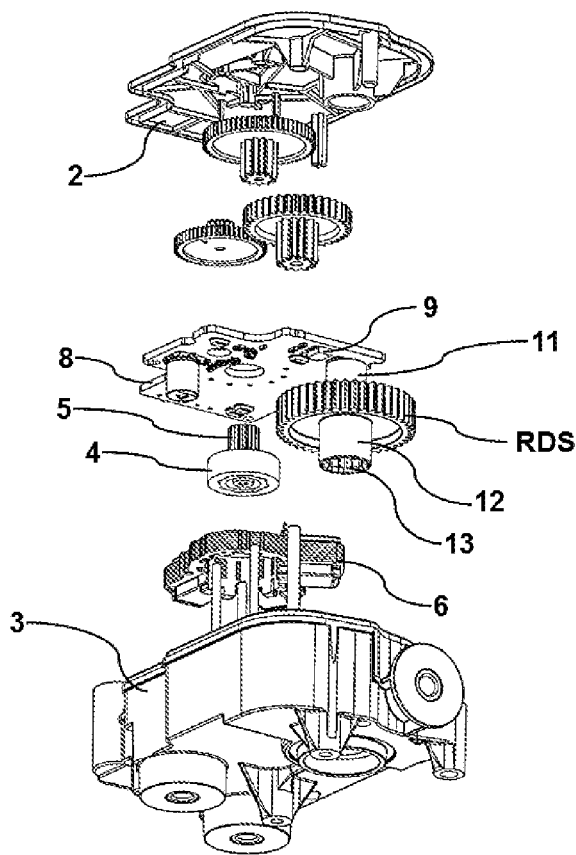
Figure 1C:
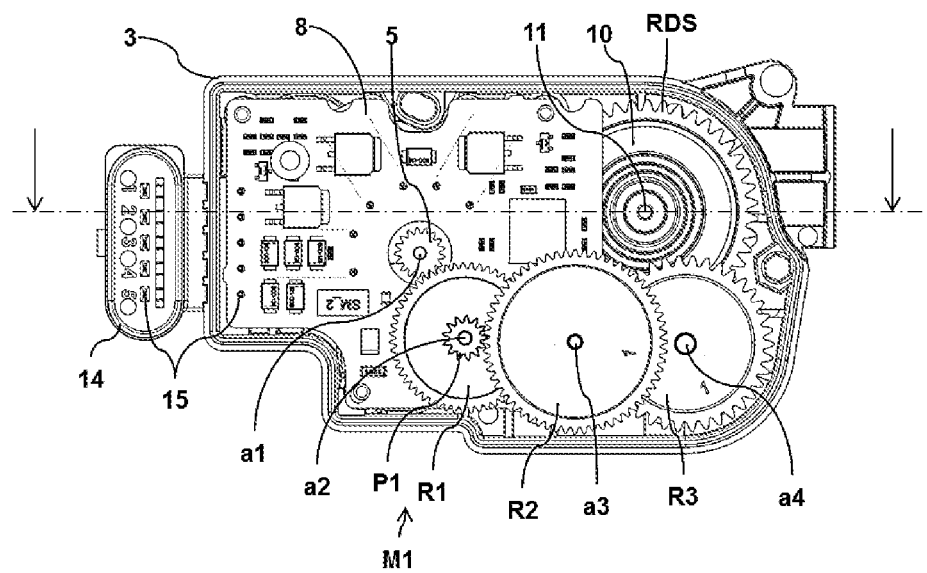

FIGS. 1a to 1d show a first embodiment typical of the invention. The geared motor unit consists of a housing 1 formed by the assembly of an upper 2 and lower 3 casing wherein a motor is provided, consisting of a coiled stator assembly 6 which magnetically cooperates with a rotor 4 consisting of one or more pair(s) of magnetized poles. This rotor 4 is guided in rotation by an input shaft a1 and is extended by a pinion 5 which meshes with a gear train forming a mechanical movement-reducer reducing the mechanical stroke and multiplying the force at the output of this train. The position of the toothed output gear RDS of this gear train is known by means of a magnetic sensor consisting of a magneto-sensitive probe 9 and a magnet 10.

A single printed circuit board 8 enables the power supply and control of the motor as well as the knowledge of the output position via the sensitive magneto-resistive probe 9 placed on the same circuit. The coiled stator assembly 6 is supplied by means of connecting lugs 7 arranged perpendicular to the plane of the circuit 8 plane and mechanically and electrically connected thereto. In another embodiment (not shown) the wires of the coils can be directly connected to the circuit. The power supply and communication with the external environment are carried out by means of a connector 14 the connection lugs 15 of which go through the housing 3 to receive the user's counter-connector on the outside and on the inside to be electrically and mechanically connected to the printed circuit board.

The figure shows the arrangement of the gear train here consisting of four reduction stages, the number of stages not being restrictive. These stages consist of toothed pinion/gear assemblies supported by the guide shafts a1, a2, a3 and a4. The toothed output gear RDS is guided by two guide shafts 11 and 12, with these elements RDS, 11, 12 forming one and the same part, but it may be considered to attach the guide shafts to the toothed output gear (not shown). The shaft a2 carries the moving part M1 formed by a toothed gear R1 which meshes with the toothed input pinion 5 forming the first reduction stage.

The shaft a3 carries the moving part M2 formed by a toothed pinion P2 and a toothed gear R2 which meshes with the toothed pinion P1 forming the second reduction stage. The moving parts M1 and M2 are arranged head to tail, the pinions P1 and P2 axially extending in an opposite direction in order to limit the height of the geared motor unit, the gear R2 being no higher than the pinion P1. The shaft a4 carries the moving part M3 formed by a toothed pinion P3 and a toothed gear R3 which meshes with the toothed pinion P2 forming the third reduction stage. Finally, the output gear RDS meshes with the toothed pinion P3 forming the fourth reduction stage.

It should be noted that these different connection stages can be either in a unitary or non-unitary reduction ratio. The moving parts M1 and M2 are arranged on the side opposite the circuit 8 with respect to the stator assembly 6, the pinion 5 and the shaft a1 thereof passing through the circuit, as well as the shaft a2. Then the moving part M3 and the output gear RDS go back to the stator assembly 6 level to provide a compact geared motor unit in the direction of the output shaft. However, the arrangement of the various gears is not limited to this embodiment, for example the gears can be partially or totally arranged under the stator assembly and the guide shafts have several gear/pinion moving parts (not shown).

Figure 1D:
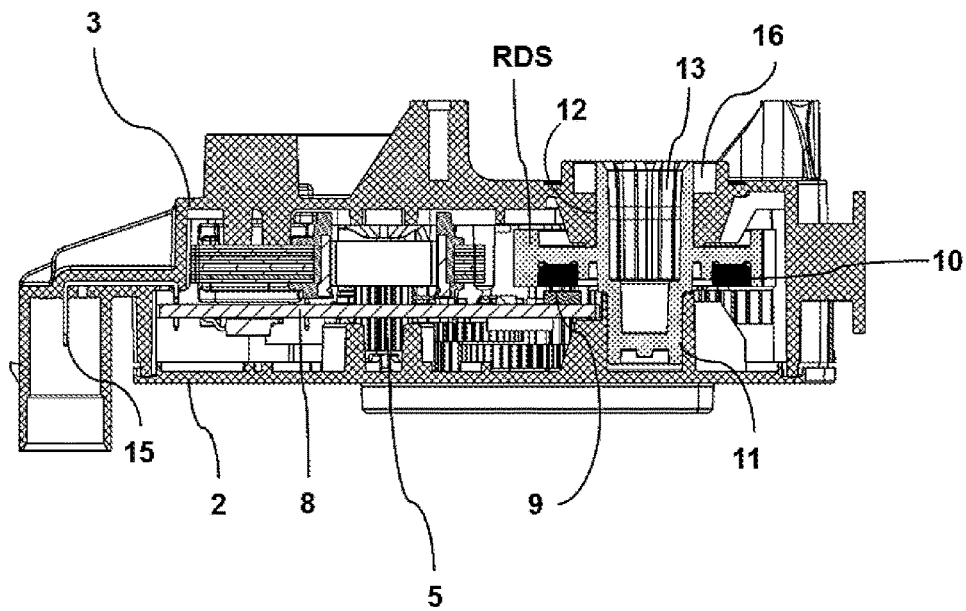

FIG. 1d enables a better visualization of the guiding of the output gear RDS and the embodiment of the position sensor. A coupling 13 is used to connect any external component to be moved (not shown). As the RDS is hollow and flush with the housing, the coupling 13 takes place inside the RDS in order to be easily connected and make the actuator more compact. However, this type of connection is not restrictive, the connection can for example be easily made through, or be made outside the housing if the shafts 12 and/or 11 are extended.

The RDS is guided on either side of the printed circuit board 8 by means of the shapes 11 and 12 that slide in the lower 3 and upper 2 casing of the geared motor unit. The quality of the guiding as well as the resistance thereof to the forces created by the gears or the external element is thus improved and the simplicity thereof limits the cost of production. However, this type of guiding is not restrictive and the use of intermediate guiding elements using, for example, bearings or plain bearings is possible (not shown). A seal 16 positioned around the shape 12 and the lower casing 3 can seal the geared motor unit against the external environment. The use of a sensor using a shaft-end magnet is then no longer possible without adding costly complications such as the use of a second printed circuit board.

A ring-shaped sensor magnet 10 is arranged here around the shaft of the output gear RDS and rigidly connected thereto. In order to limit the space requirement, the sensor magnet 10 is advantageously integrated in the output gear RDS but its positioning is not limited to this example, it can for example be placed around the guide shafts 11 and 12 (not shown). Similarly, the sensor magnet 10 can be in the form of an angular sector extending over an angle of less than 360°.

The magneto-sensitive probe 9 is positioned on the printed circuit board 8, here axially opposite the sensor magnet 10 in order to detect a variation in the magnetic angle or in the amplitude of the magnetic field generated by the sensor magnet 10. The position of the probe 9 on the printed circuit board 8, relative to the sensor magnet 10, is not restrictive and may vary according to the type of magnetization, magnet and probe. For example, the probe may be radially facing the magnet or axially and radially offset (not shown).

The magnet 10 can be attached in different ways to the output gear RDS or to the output shafts. In a non restrictive way, it can be attached by gluing, riveting, interference, screwing or overmoulding. Depending on the type of magnet it can still be directly injected. Magnetization can be provided before or after assembly with the RDS, or during injection.

Figure 2A:
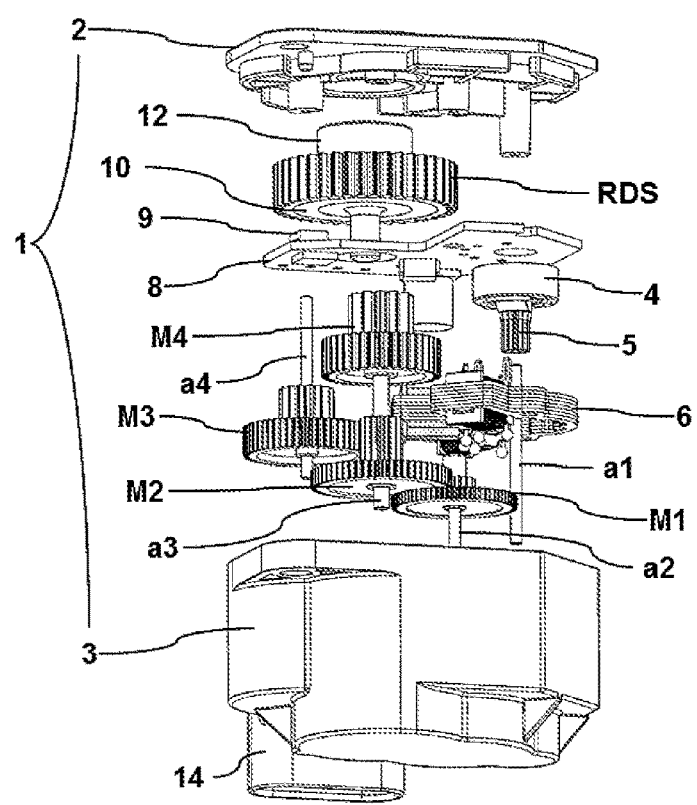
FIGS. 2a, 2b and 2c represent a second embodiment of a geared motor unit according to the invention according to views, respectively, exploded in view in rear perspective, top without upper casing, longitudinal sectional view.

FIG. 2a shows a second embodiment of the invention. At the input of the geared motor unit is an electric motor consisting of a coiled stator assembly 6 which magnetically cooperates with a rotor 4 consisting of one or more pairs of magnetized poles. This rotor 4 is supported by an input shaft a1 and is extended by an input pinion 5 which meshes with a gear train forming a mechanical movement-reducer, reducing the mechanical stroke and multiplying the force at the output of this train.

Figure 2B:
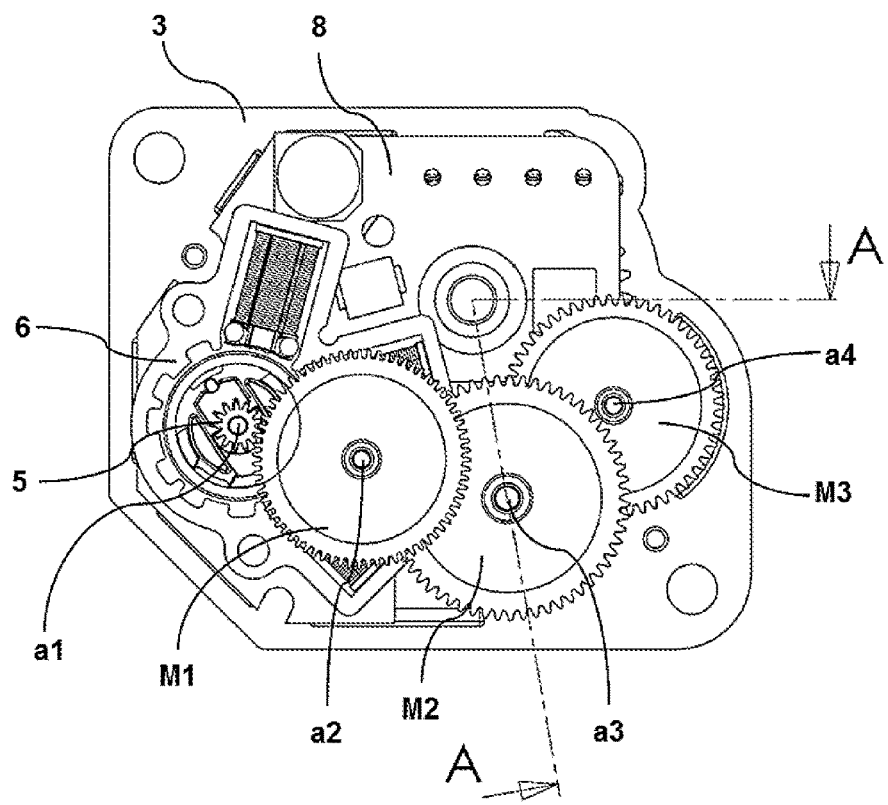

Unlike the first example, the gear train begins to extend under the stator assembly 6 and the printed circuit board 8. FIG. 2b makes it easier to distinguish the input pinion 5 carried by the shaft a1 and the moving part M1, M2 and M3 consisting of a toothed pinion/gear couple forming the first three reduction stages and carried respectively by the shafts a2, a3 and a4.

Figure 2C:
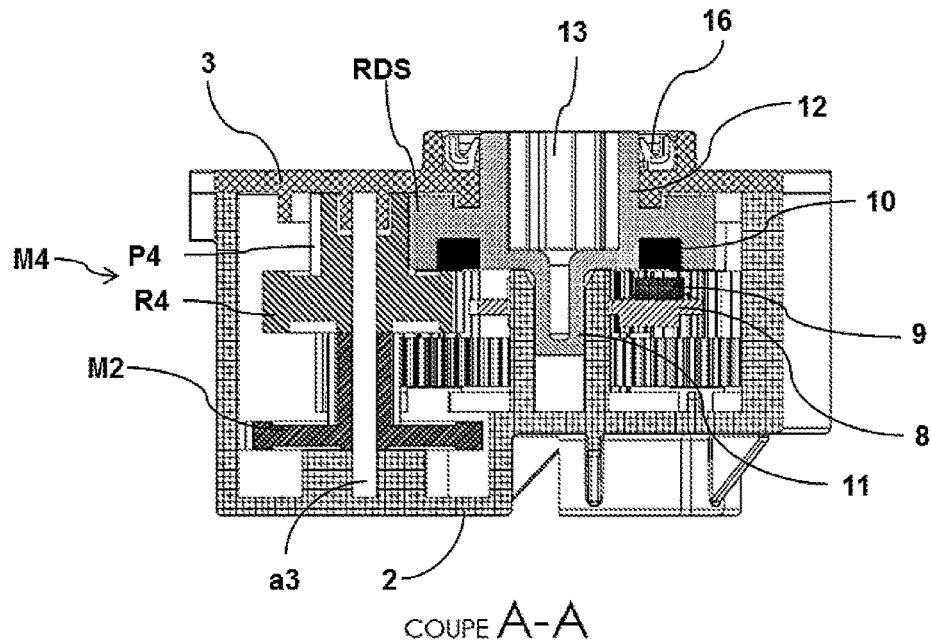

Another feature of this geared motor unit is that it has five reduction stages without using an additional guide shaft compared to the first example with four reduction stages. FIG. 2c shows a cross-sectional view to clearly visualize this embodiment. For this purpose, the shaft a3 carries two superposed toothed gears M2 and M4. The toothed pinion of the moving part M3 meshes with the toothed gear R4 of the moving part M4 to form the fourth reduction stage. This solution is economically advantageous and provides a good compactness.

Finally, the output gear RDS meshes with the toothed pinion P4 forming the fifth reduction stage. This last stage is located above the printed circuit board 8. Contrary to the first embodiment, the coupling 13 is therefore located on the same side as the printed circuit board 8. Guiding the RDS is provided on both sides of the printed circuit board 8 by means of the guides 11 and 12 which slide in the lower 3 and upper 2 casing forming the housing of the geared motor unit. The magneto-sensitive probe 9 is positioned on the printed circuit board 8, here axially opposite the sensor magnet 10 in order to detect a variation in the magnetic angle or in the amplitude of the magnetic field generated by the sensor magnet 10.

Figure 3A:
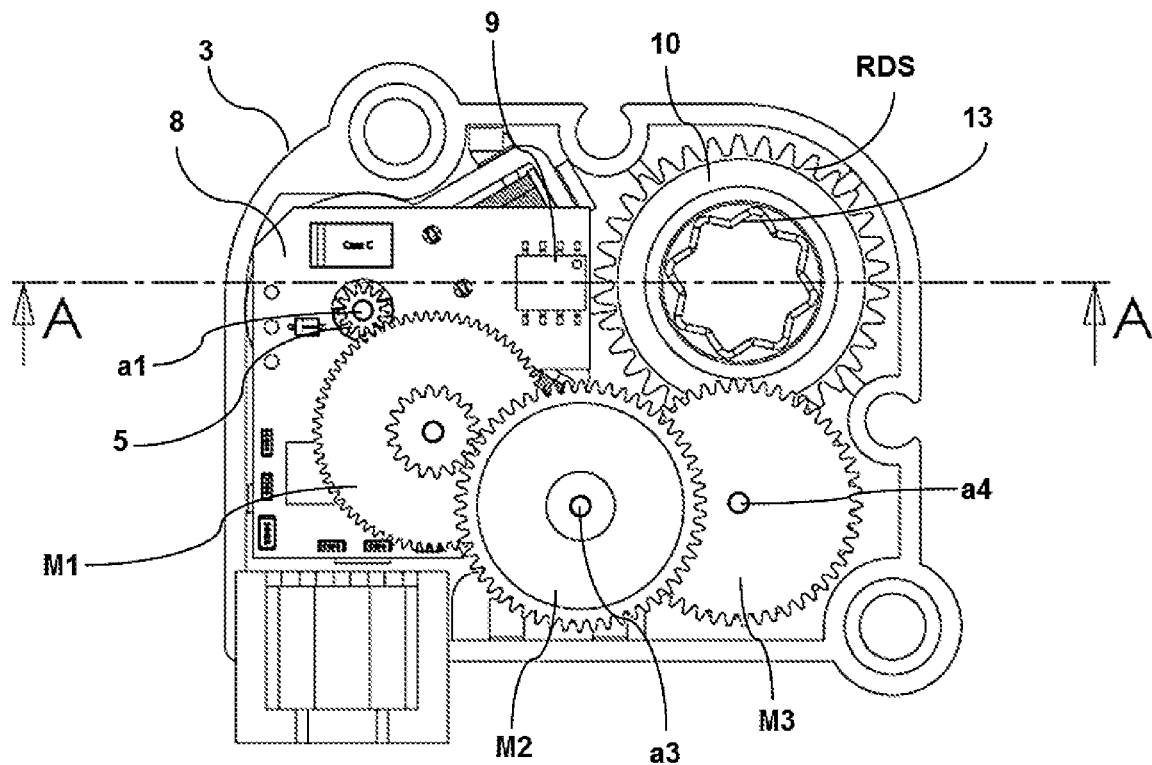
FIGS. 3a and 3b represent a third embodiment of a geared motor unit according to the invention according to views, respectively, of top without upper casing, longitudinal sectional view.

FIG. 3a illustrates a third embodiment of the invention. The geared motor unit consists of six reduction stages. The first three stages are made in a similar way to the first embodiment by means of the toothed pinion 5 carried by the shaft a1 and moving parts M1 and M2 carried by the shafts a2 and a3.

In the same way as in the second embodiment, stages four and five are realized thanks to two additional moving parts M4 and M5 (not shown) respectively located under the moving part M2 and M3 and guided by the shafts a3 and a4. Finally, the output gear RDS meshes with the toothed pinion of the moving part M5 forming the sixth reduction stage. Thus this geared motor unit provides a reduced footprint and a low thickness.

Figure 3B:
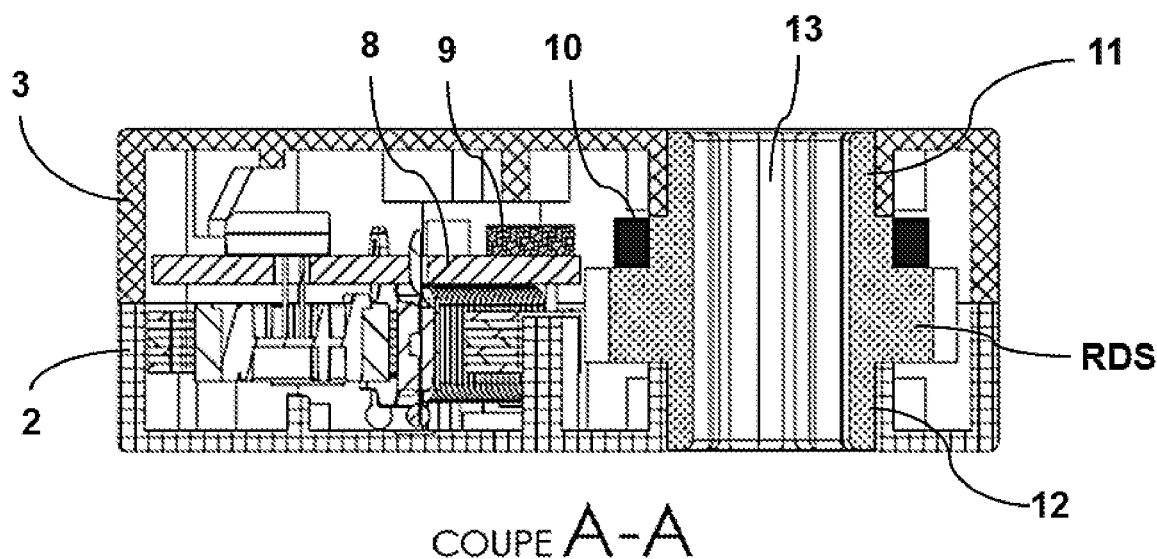

FIG. 3b shows a cross-sectional view of the actuator to better visualize the RDS guidance and the design of the position sensor. One of the particularities of the embodiment is to provide a hollow and through coupling 13 so that the external element to be moved can be mounted on either side of the geared motor unit. This also makes it impossible to use a sensor of the shaft end type.

Guiding the RDS is provided on both sides of the printed circuit board 8 by means of the guides 11 and 12 which slide in the lower 3 and upper 2 casing forming the housing of the geared motor unit. The lay-out of the RDS and its reduced dimensions do not make it possible, as for the first two embodiments, to provide for a sensor magnet 10 within the toothed RDS, located axially opposite the magneto-sensitive probe 9. Thus the ring-shaped magnet 10 is positioned above the toothed RDS, as an extension of the shape 11. The magneto-sensitive probe 9 connected to the printed circuit board 8 is positioned radially opposite the sensor magnet 10 in order to detect a variation in the magnetic angle or amplitude of the magnetic field generated by the sensor magnet 10.

Figure 4A:
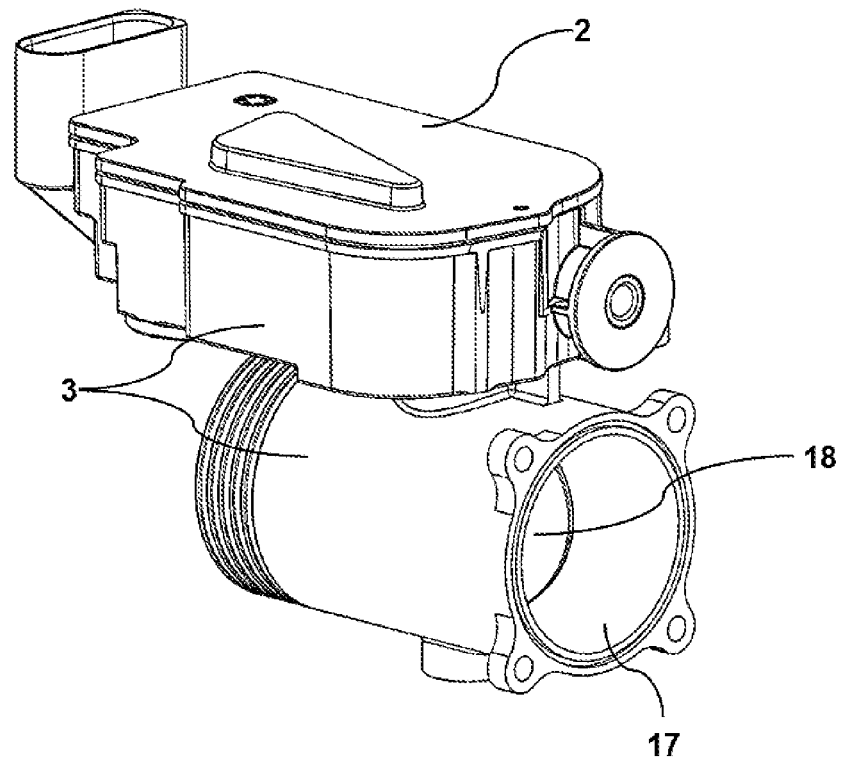
FIGS. 4a and 4b represent a fourth embodiment of a geared motor unit according to the invention integrating a butterfly valve body for automotive air intake, according to views, respectively, in front perspective and in longitudinal section.

FIG. 4a shows a fourth embodiment of the invention derived from the first embodiment. The geared motor unit directly integrates a more advanced function here, here a valve body (for a "butterfly" type flap) for automotive air intake. The housing 1 always consists of an upper 2 and a lower 3 casing but the lower casing 3 integrates a stem 17, here to form a so-called "butterfly" valve body. The geared motor unit makes it possible to control the air intake by operating the movable flap 18.

Figure 4B:
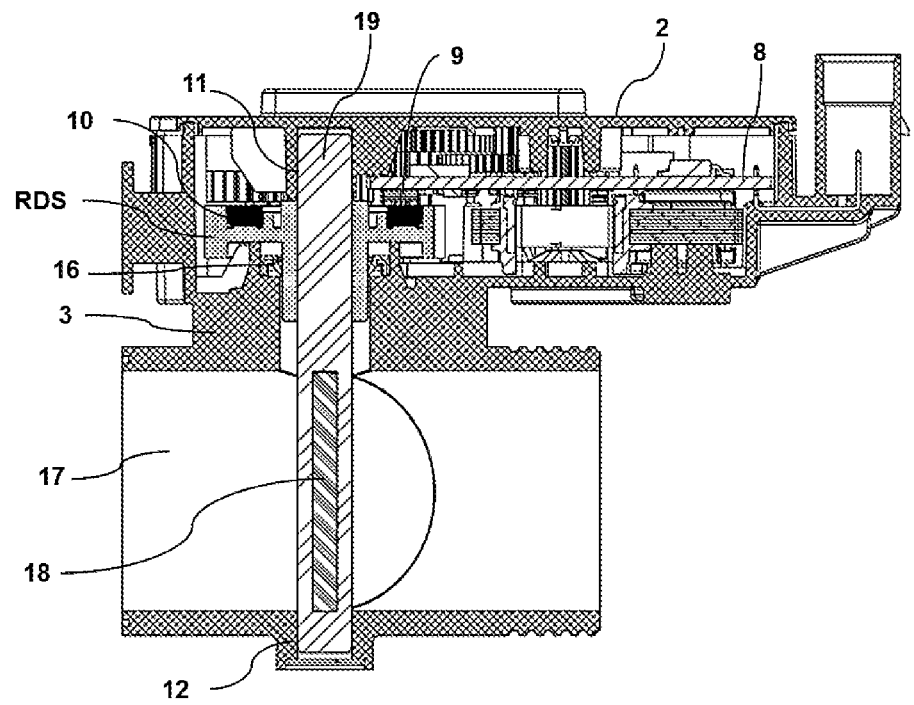

FIG. 4b shows a cross-sectional view of the actuator to disclose in greater details the construction of the output. The toothed output gear RDS, which always advantageously integrates the sensor magnet 10, is mounted here on an output shaft 19. The method for assembling the toothed output gear RDS on the output shaft 19 is not restrictive, it can for example be countersunk, glued, crimped or overmoulded. The output shaft 19 is guided and slides in the shapes 11 and 12.

The output shaft 19 is guided on either side of the printed circuit board 8 by means of the shapes 11 and 12 which slide in the lower casing 3 forming the stem 17 of the valve body and the upper casing 2. However, this type of guidance is not restrictive and the use of intermediate guide elements using, for example, bearings or plain bearings is possible (not shown). A seal 16 positioned around the toothed output gear RDS or the output shaft (not shown) and the lower casing 3 can seal the geared motor unit part with the valve body stem 17. A movable flap 18 is mounted on the output shaft 19.

The invention claimed is:

1. A geared motor unit comprising:
   a housing;
   an electric motor comprising a coiled stator assembly and a magnetized rotor;
   the housing further comprising a printed circuit board operably connecting and controlling the motor;
   a train of motion-reducing gears;
   a magneto-sensitive probe;
   the gear train comprising a toothed movement output gear;
   a sensor magnet being ring-shaped and being rigidly connected to the output gear;
   the output gear being extended on either side of the sensor magnet by two guide shafts cooperating with a guide present in opposite walls of the housing;
   the ring-shaped magnet surrounding an axis of rotation of the output gear;

the printed circuit board including a controller of the motor and extending to a vicinity of the output gear; and the printed circuit board having, in an area located in the vicinity of the output gear, the magneto-sensitive probe connected directly, electrically and mechanically, to the area and located facing the ring-shaped magnet.

2. A geared motor unit according to claim 1, wherein the magnetization direction of the sensor magnet has at least one angularly variable component.

3. A geared motor unit according to claim 1, wherein the rotor is extended by a pinion, and the pinion and the output gear carrying the ring-shaped magnet are located on either side of the printed circuit board.

4. A geared motor unit according to claim 3, wherein the magneto-sensitive probe is mounted on the printed circuit board on a surface opposite one carrying most of the other electronic components necessary to control the electric motor.

5. A geared motor unit according to claim 1, wherein the gear train comprises intermediate toothed gears located on one side of the printed circuit board and the output gear is located on an opposite side of the printed circuit board.

6. A geared motor unit according to claim 1, wherein the rotor is extended by a pinion, on one side of the printed circuit board, the gear train having a series of intermediate toothed gears controlling the output gear positioned on an opposite side of the printed circuit board.

7. A geared motor unit according to claim 6, further comprising a shaft common to two of the intermediate toothed gears.

8. A geared motor unit according to claim 6, wherein the printed circuit board is traversed by the shaft of the output gear.

9. A geared motor unit according to claim 1, wherein the printed circuit board is traversed by the shaft of the rotor.

10. A geared motor unit according to claim 1, wherein the permanent sensor magnet has an angularly variable magnetization direction and a tubular shape, the magneto-sensitive probe being positioned in a radial position with respect to the sensor magnet.

11. A geared motor unit according to claim 1, wherein the shaft of the output gear is hollow and goes through the housing.

12. A geared motor unit according to claim 1, wherein housing includes means for guiding each of the ends of the shaft of the output gear on either side of the printed circuit board.

13. A geared motor unit according to claim 1, wherein the output gear is coaxial with the rotor.

14. A geared motor unit according to claim 1, wherein the housing integrates a stem shut by a movable flap rigidly connected to and controlled by the toothed output gear.

15. A geared motor unit comprising:
a housing;
an electric motor comprising a coiled stator assembly and a magnetized rotor;
the housing further comprising a printed circuit board operably connecting and controlling the motor;
a train of motion-reducing gears;
a magneto-sensitive probe;
the gear train comprising a toothed movement output gear;
a sensor magnet being ring-shaped and being rigidly connected to the output gear;
the output gear being extended on either side of the sensor magnet by two guide shafts cooperating with a guide present in opposite walls of the housing;
the ring-shaped magnet surrounding an axis of rotation of the output gear;
the printed circuit board including a controller of the motor and extending to a vicinity of the output gear;
the printed circuit board having, in an area located in the vicinity of the output gear, the magneto-sensitive probe connected directly, electrically and mechanically, to the area and located facing the ring-shaped magnet; and
an air conditioning valve comprising a rotating flap actuated by the shaft of the output gear.

16. An air shutter comprising at least one movable flap actuated by the shaft of the output gear of the geared motor unit according to claim 1.

* * * * *